US007577513B2

(12) United States Patent
Kumagai et al.

(10) Patent No.: US 7,577,513 B2
(45) Date of Patent: Aug. 18, 2009

(54) TRAFFIC INFORMATION PREDICTION SYSTEM

(75) Inventors: Masatoshi Kumagai, Hitachi (JP); Takumi Fushiki, Hitachi (JP); Takayoshi Yokota, Hitachiota (JP); Kazuya Kimita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 837 days.

(21) Appl. No.: 11/206,817

(22) Filed: Aug. 19, 2005

(65) Prior Publication Data

US 2006/0064234 A1 Mar. 23, 2006

(30) Foreign Application Priority Data

Sep. 17, 2004 (JP) ............................. 2004-270663

(51) Int. Cl.
*G06F 19/00* (2006.01)

(52) U.S. Cl. ....................... 701/117; 701/118; 340/906; 340/995.13

(58) Field of Classification Search ..................... 701/1, 701/117-120, 207, 209, 210; 340/906, 995.1, 340/995.13, 905

See application file for complete search history.

(56) References Cited

U.S. PATENT DOCUMENTS 6,522,970 B2 * 2/2003 Kerner ....................... 701/117
6,813,555 B1 * 11/2004 Kerner ....................... 701/117

FOREIGN PATENT DOCUMENTS

| | | |
|---|---|---|
| JP | 2002-222484 | 8/2002 |
| JP | 2005-004668 | 1/2005 |

OTHER PUBLICATIONS

Kumagai et al., "Traffic Information Prediction Method Based on Feature Space Projection", IPSJ SIG Technical Report, No. 14, pp. 51-57, Sep. 9, 2003.

* cited by examiner

*Primary Examiner*—Gertrude Arthur Jeanglaud
(74) *Attorney, Agent, or Firm*—Crowell & Moring LLP

(57) ABSTRACT

In a congestion prediction using measurement data which is acquired by an on-road sensor or a probe car, and which includes none of explicit information about bottleneck points, with respect to time-sequence data on congestion ranges accumulated in the past, data on congestion front-end positions are summarized into plural clusters by the clustering. Representative value in each cluster is assumed as position of each bottleneck. A regression analysis, in which day factors are defined as independent variables, is performed with congestion length from each bottleneck point selected as the target. Here, the day factors refer to factors such as day of the week, national holiday/etc. It then becomes possible to precisely predict a future congestion length.

10 Claims, 10 Drawing Sheets

FIG.6

VARIABLE →

SAMPLE ↓

| | | | |
|---|---|---|---|
| X(1,1) | X(1,2) | ... | X(1,M) |
| X(2,1) | X(2,2) | ... | X(2,M) |
| ... | ... | ... | ... |
| X(N,1) | X(N,2) | ... | X(N,M) |

FIG.7

VARIABLE →

SAMPLE ↓

| | | | | | | | | | | | | |
|---|---|---|---|---|---|---|---|---|---|---|---|---|
| X(1,1) | X(1,2) | ... | X(1,M) | X(1,M+1) | X(1,M+2) | ... | X(1,2M) | ... | X(1,(C-1)M+1) | X(1,(C-1)M+2) | ... | X(1,CM) |
| X(2,1) | X(2,2) | ... | X(2,M) | X(2,M+1) | X(2,M+2) | ... | X(2,2M) | ... | X(2,(C-1)M+1) | X(2,(C-1)M+2) | ... | X(2,CM) |
| ... | ... | ... | ... | ... | ... | ... | ... | ... | ... | ... | ... | ... |
| X(N,1) | X(N,2) | ... | X(N,M) | X(N,M+1) | X(N,M+2) | ... | X(N,2M) | ... | X(N,(C-1)M+1) | X(N,(C-1)M+2) | ... | X(N,CM) |

ARE EQUIVALENT TO L (1, d, t)

ARE EQUIVALENT TO L (2, d, t)

ARE EQUIVALENT TO L (C, d, t)

FIG.8

VARIABLE →

SAMPLE ↓

| | | | | |
|---|---|---|---|---|
| X(1,1) | X(1,2) | . . . | X(1,M) | DATA OF LINK 1 |
| X(2,1) | X(2,2) | . . . | X(2,M) | |
| . . . | . . . | . . . | . . . | |
| X(N,1) | X(N,2) | . . . | X(N,M) | |
| X(N+1,1) | X(N+1,2) | . . . | X(N+1,M) | DATA OF LINK 2 |
| X(N+2,1) | X(N+2,2) | . . . | X(N+2,M) | |
| . . . | . . . | . . . | . . . | |
| X(2N,1) | X(2N,2) | . . . | X(2N,M) | |
| . . . | . . . | . . . | . . . | |
| X((R-1)N+1,1) | X((R-1)N+1,2) | . . . | X((R-1)N+1,M) | DATA OF LINK R |
| X((R-1)N+2,1) | X((R-1)N+2,2) | . . . | X((R-1)N+2,M) | |
| . . . | . . . | . . . | . . . | |
| X(RN,1) | X(RN,2) | . . . | X(RN,M) | |

TRAFFIC INFORMATION PREDICTION SYSTEM

CROSS-REFERENCE TO RELATED APPLICATION

This invention is related to U.S. patent application Ser. No. 11/189,780, entitled "Traffic Information Prediction Device," filed by Takumi Fushiki et al., on Jul. 27, 2005, which has a claim of foreign priority under 35 U.S.C. §119 to Japanese Patent Application No. 2004-219491.

BACKGROUND OF THE INVENTION

1. Field of the Invention

The present invention relates to prediction on traffic information.

2. Description of the Related Art

Traffic information, such as congestion level, travel time, and traffic volume, varies depending on day factors and points-in-time. For example, the traffic information varies such that roads become more crowded on Friday evenings as compared with almost the same points-in-time on Monday to Thursday, and such that it takes a considerable time to move to a pleasure spot on a fine-weather holiday. Here, the day factors refer to factors for indicating attributes of a day, such as day of the week, national holiday/festival, gotoobi day, long-term consecutive holidays, month, season, and weather. From this variation of the traffic information, by applying a statistical processing to past traffic information in a manner of being made related with the day factors and the points-in-time, it becomes possible to predict the traffic information on a desired time-and-date based on the day factors and the points-in-time.

Of the traffic information, the travel time and the traffic volume are numerical continuous quantities. As a result, by performing the regression analysis in which the day factors are defined as independent variables on each point-in-time basis of the prediction targets, it becomes possible to acquire predicted information into which the various day factors are added. Moreover, focusing attention on the fact that the traffic information is time-sequence data having periodicity on a day-unit basis, the traffic-information time-sequence data by the amount of one day is approximately represented by a linear summation of plural pieces of basis data which represent, e.g., rush hours in the morning or evening. Then, the regression analysis in which the day factors are defined as the independent variables is performed with respect to summation intensity of each basis data. This allows identification of an efficient regression model and execution of the prediction operation using the regression model in a feature space whose dimension is lowered as compared with the original traffic information (e.g., Kumagai et al. "Traffic Information Prediction Method Based on Feature Space Projection", Information Processing Society of Japan SIG Technical Report: "Intelligent Transport System", No. 14, pp. 51-57, Sep. 9, 2003).

On the other hand, when trying to predict the congestion level which is indicated by indicators such as "smooth, crowded, congested", the direct application of the regression analysis is impossible since the congestion level is non-numerical discontinuous quantities. Accordingly, it becomes necessary to convert the non-numerical indicators into numerical information or the like. In contrast thereto, if a decision tree is used where the day factors and the points-in-time are employed as judgment conditions, it is possible to database and use the non-numerical indicators with no such conversion made thereto. For example, in JP-A-2002-222484, a congestion pattern such as "smooth-smooth-crowded-congested-crowded" in plural and fixed road sections is predicted using the decision-tree model. If, however, information on a congestion range is selected as the prediction target, instances in past data diverge over a variety of ranges. Here, the information on the congestion range is data where the non-numerical information (i.e., the congestion level) and continuous numerical information (i.e., congestion front-end position and congestion length) are formed in pairs. This divergence makes it impossible to database the instances by summarizing the instances. Accordingly, a decision tree acquired turns out to become a one which is exceedingly large in size and is excessively dependent on the past data. Consequently, it is impossible to use this decision tree for actual prediction.

In the prediction on the congestion range, if the congestion length alone is to be predicted, the regression analysis in which the day factors are defined as the independent variables is applicable on each congestion-level rank basis as is described above. In many cases, however, the congestion front-end position also varies depending on the time-and-date. Also, in many cases, the congestion occurs in such a manner that a point at which a structural bottleneck exists along the road becomes the start. These situations make it impossible to predict the congestion front-end position by simply applying a statistical processing such as the regression analysis. For example, assume that, on a certain road link, bottleneck points exist at a 500-m point and a 2500-m point from the downstream side of the link. Here, presentation of predicted information as will be described below is inappropriate: Namely, simply because the congestion range on a certain time-and-date is 200 m away from the 500-m point, and the congestion range on another time-and-date is 400 m away from the 2500-m point, average congestion range is 300 m away from a 1500-m point. Concerning the congestion range, it is advisable to individually predict the congestion length from each bottleneck point. Actual traffic information such as VICS (: Vehicle Information and Communication System) data and probe data, however, includes none of explicit information for indicating each bottleneck point. Also, information on the congestion front-end positions, i.e., measurement information acquired by an on-road sensor or a probe car, is data which distributes in a manner of being accompanied by a certain width by measurement error or the like on the periphery of each actual bottleneck point. This makes it impossible to perform the statistical processing for the congestion length by immediately assuming that each of the measured congestion front-end positions is each bottleneck point.

SUMMARY OF THE INVENTION

A problem to be solved is the following point: Namely, in the prediction on a congestion using the measurement data which is acquired by an on-road sensor or a probe car, and which includes none of explicit information about bottleneck points, it is impossible in the conventional technologies to perform a statistical processing which reflects road-traffic characteristics that the bottleneck locations will cause congestions to occur.

With respect to time-sequence data on the congestion ranges accumulated in the past, data on the congestion front-end positions are summarized into plural clusters by the clustering. Next, representative value in each cluster (such as average value, median value, and minimum value of the in-cluster data) is assumed to be position of each bottleneck point. Moreover, the regression analysis, in which day factors are defined as independent variables, is performed with the congestion length from each bottleneck point selected as the target. Here, the day factors refer to factors such as day of the week, national holiday/festival, gotoobi day, long-term consecutive holidays, month, season, and weather.

The traffic-information prediction method according to the present invention exhibits the following advantage: Namely, even if none of the explicit information about the bottleneck points is inputted, the bottleneck points are identified from the information on the congestion front-end positions which are measured by a mobile unit equipped with a sensor such as an on-road sensor or a probe car. This allows the congestion length from each bottleneck point to be predicted in a manner of being made related with the day factors.

BRIEF DESCRIPTION OF THE DRAWINGS

FIG. 6 is a format example of data used in the system for predicting the traffic-information data by representing the traffic-information data by the linear summation of the basis data;

FIG. 7 is another format example of the data used in the system for predicting the traffic-information data by representing the traffic-information data by the linear summation of the basis data;

FIG. 8 is still another format example of the data used in the system for predicting the traffic-information data by representing the traffic-information data by the linear summation of the basis data;

DETAILED DESCRIPTION OF THE INVENTION

Hereinafter, using the present invention and based on past data on congestion front-end positions and congestion lengths, the explanation will be given below concerning configuration of a prediction method for predicting the congestion lengths from bottleneck points.

Embodiment 1

Figure 1:
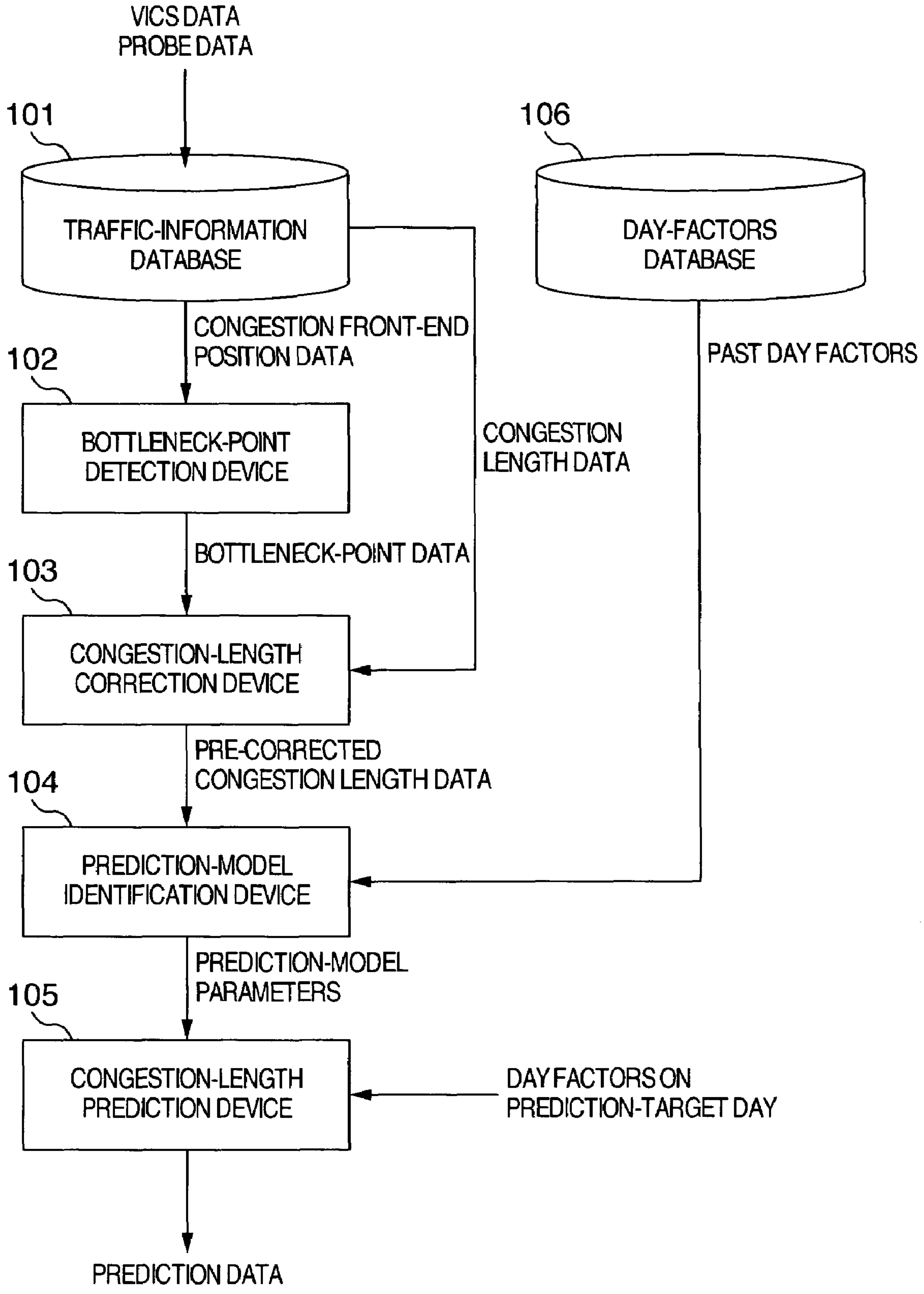
FIG. 1 is a block diagram of a system for detecting bottleneck points from data on congestion front-end positions, and predicting congestion length with each bottleneck point selected as the reference.
Figure 2:
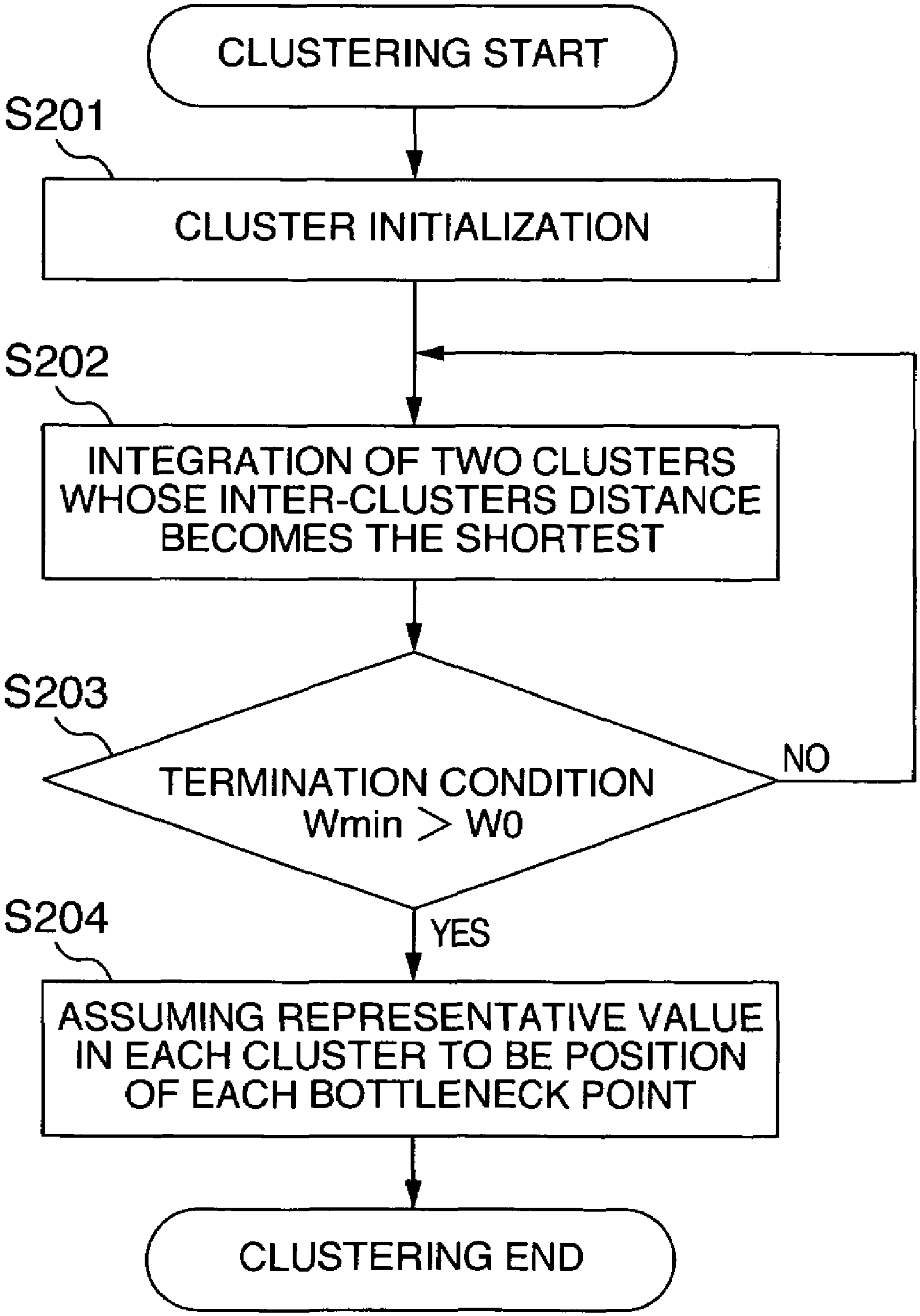
FIG. 2 is a processing flow of a methodology for detecting the bottleneck points from the data on the congestion front-end positions.
Figure 3:
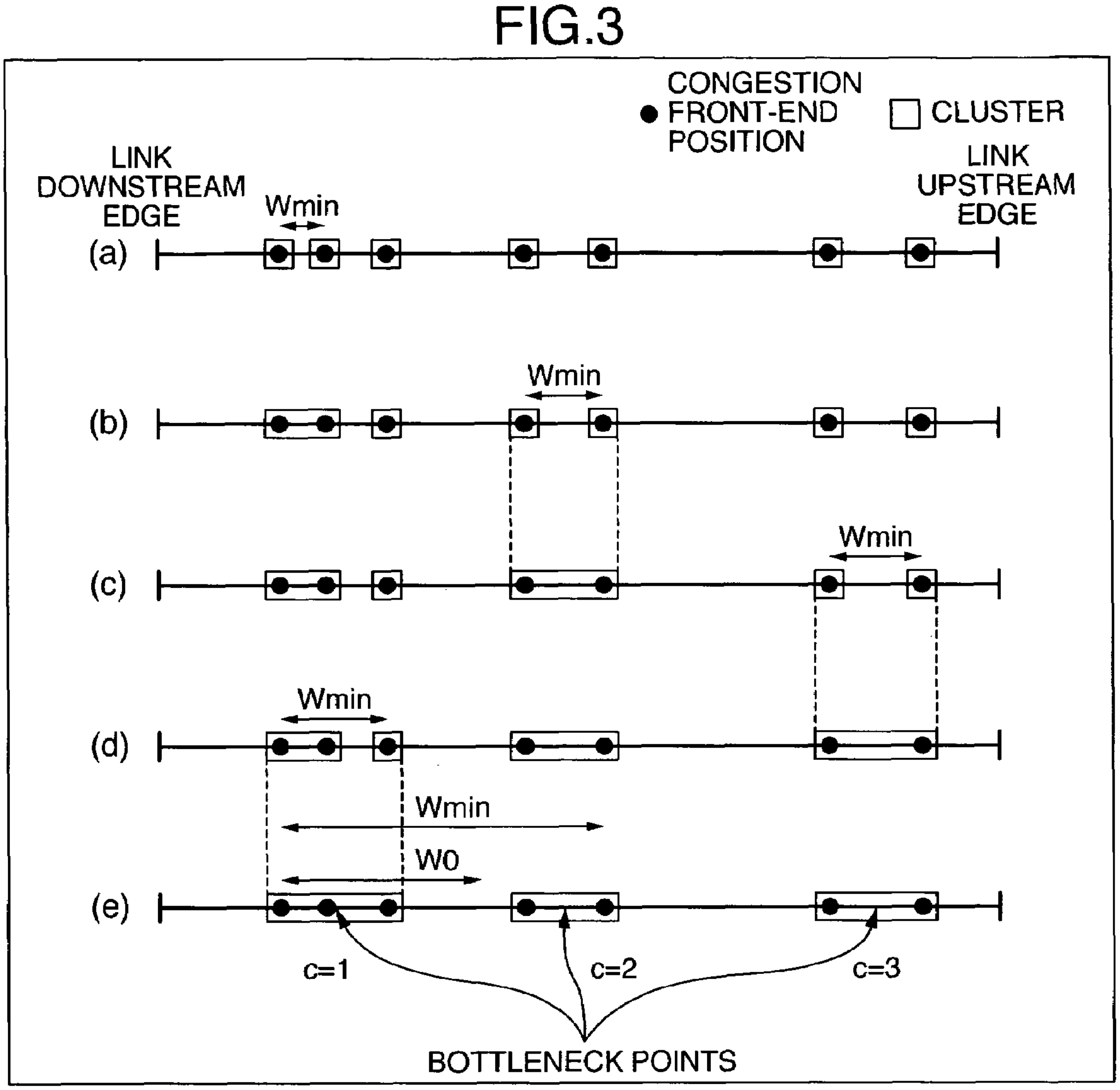
FIG. 3 is a conceptual diagram of the methodology for detecting the bottleneck points from the data on the congestion front-end positions.

FIG. 1 illustrates configuration of a congestion-length prediction device where the present invention is used. A traffic-information database 101 is a database device for accumulating past traffic information collected by a mobile unit equipped with a sensor such as a VICS (: Vehicle Information and Communication System) or a probe car. A bottleneck-point detection device 102 performs detection of bottleneck points by the clustering. In this clustering, from the past congestion front-end position data on each link basis accumulated in the traffic-information database 101, the data existing in a spatially closer range on one and the same road link are summarized, then being assumed to be a continuous data range. FIG. 2 illustrates a flow diagram of this processing. A processing step 201 (which, hereinafter, will be described as "S201". The other processing steps will also be described similarly) is initialization of clusters. Here, as indicated in (a) in FIG. 3, each of the congestion front-end position data measured in the past is defined as one cluster. A processing S202 is integration of the clusters. Here, between the respective clusters, as indicated in (a)→(b), (b)→(c), (c)→(d), and (d)→(e) in FIG. 3, two clusters which result in the shortest inter-clusters distance Wmin will be integrated into one cluster. In general, as inter-clusters distance calculation methods, there exist most adjacent neighborhood method, most distant neighborhood method, group average method, center-of-gravity method, and the like. Although, in FIG. 3, the illustration is given using the most distant neighborhood method, the calculation method is not limited to this one. The processing at S202 is repeatedly executed until a termination condition S203 holds. This termination condition means that, as indicated in (e) in FIG. 3, the shortest inter-clusters distance Wmin exceeds a threshold value W0, namely, the summarizations of the congestion front-end positions existing in the certain distance range have been completed all. In addition thereto, another setting of the termination condition is such that detecting n locations of main bottleneck points on the link necessitates the clusters whose number is set to be smaller than a threshold value n. Also, in the case of the data where the congestion front-end positions distribute loosely, there exist some cases where simply using the shortest inter-clusters distance as the termination condition of the clustering results in formation of a large number of clusters where the data number is small. Consequently, there exists a termination-condition setting way that magnitude of variance of the data within each cluster is used as the termination condition of the clustering ring, and that the concrete termination condition is defined such that the value of the variance exceeds a threshold value. On account of this setting way, if, like a normal distribution or t distribution, the data distributes on the periphery of each bottleneck point with a certain peak, it becomes possible to form one cluster by combining data existing at the foot of the distribution with data existing at the top of the distribution. In a processing at S204, as indicated in (e) in FIG. 3, representative value in each cluster is determined as position of each bottleneck point. As cluster's representative-value calculation methods, there exist ones such as minimum value, maximum value, median value, mode value, and average value. Although, in FIG. 3, the illustration is given using the average value, the calculation method is not limited to this one.

Figure 4:
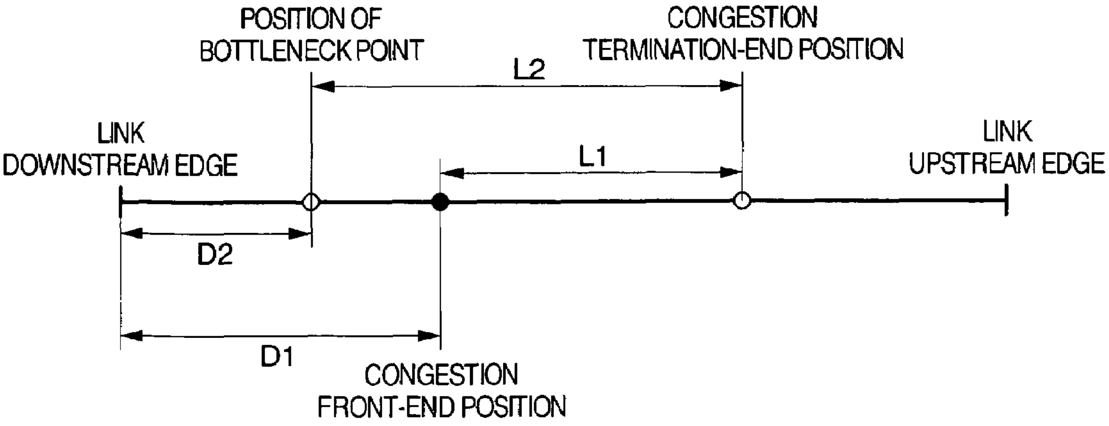
FIG. 4 is a conceptual diagram of a calculation for correcting the data oh the congestion length with each bottleneck point detected from the data on the congestion front-end positions selected as the reference.

With respect to the bottleneck points detected, a congestion-length correction device 103 performs correction of past congestion length data. Incidentally, if accuracy of the congestion length data is low, this correction processing of the congestion length data is not absolutely necessary. Also, if value itself of the congestion length data is to be provided to user, only shifting a congestion front-end position is allowable in this correction processing. However, providing information on a congestion termination-end position calculated from the congestion front-end position requires that the congestion length data be corrected in advance. As illustrated in FIG. 4, this correction processing is the following processing: Namely, the past congestion length data L1 is not a congestion length from a bottleneck point determined by the bottleneck-point detection device 102, but the congestion length from the measured congestion front-end position. Accordingly, in order that the congestion length from the bottleneck point will be presented, a difference between a distance D1 from link downstream edge to the congestion front-end position and a distance D2 from the link downstream edge to the bottleneck point is added to the congestion length data L1, thereby calculating L2:

$$L2=L1+(D1-D2). \qquad \text{(Expression 1)}$$

This is the congestion length from the bottleneck point into which the congestion length data L1 has been corrected. The congestion length data to which the correction processing like this has been applied is represented as an arrangement L (c, d, t) for number c (c=1, 2, 3, . . . ), which is attached to each bottleneck point as indicated in (e) in FIG. 3, date d, and point-in-time t. Then, the arrangement L is inputted into a prediction-model identification device 104 as pre-corrected congestion length data. If the congestion front-end position data corresponding to the bottleneck points c does not exist on the time-and-date d and t, i.e., if the congestion front-end position data does not exist within the range of the clusters which yields the bottleneck points c, it can be assumed that none of congestions caused by the bottleneck points c has occurred on the time-and-date. Consequently, L (c, d, t)=0 holds.

In the prediction-model identification device 104, the regression analysis in which day factors are defined as independent variables is performed on each bottleneck-point basis and on each point-in-time basis. Here, the day factors are factors such as day of the week, national holiday/festival, gotoobi days or days on a commercial calendar, long-term consecutive holidays, month, season, and weather. Namely, the regression analysis is performed selecting, as the target, congestion-length time-sequence data L (C, d, T) on a day-unit basis which results from fixing the bottleneck point c=C and the point-in-time t=T in the pre-corrected congestion length data L (c, d, t). This regression analysis identifies a congestion-length prediction model L (C, T, f1, f2, . . . , fN) at the bottleneck point C and at the point-in-time T. Here, f1 to fN are two-value independent variables for indicating whether or not f1 to fN correspond to the respective N types of day factors by using 1 and 0 respectively. Concerning the day-factors data to be used in the regression analysis, data whose date corresponds to the variable d in the congestion-length time-sequence data L (C, d, T) is inputted from a day-factors database 106.

A congestion-length prediction device 105 inputs day factors on a prediction-target day into the congestion-length prediction model L (C, T, f1, f2, . . . , fN) identified by the prediction-model identification device 104. This allows the prediction device 105 to calculate a congestion length L (C, T) at the bottleneck point C and at the point-in-time T, and to output the congestion length L as prediction data. In the above-described processing of the present embodiment, if plural ranks about the congestion level such as "crowded, congested" are defined in the congestion-range data, the above-described congestion-length prediction processing is carried out individually on each congestion-level rank basis. Carrying out the prediction processing in this way makes it possible to predict the congestion length such that a distinction can be made between to what extent the range of "crowded" has extended and to what extent the range of "congested" has extended.

Figure 12:
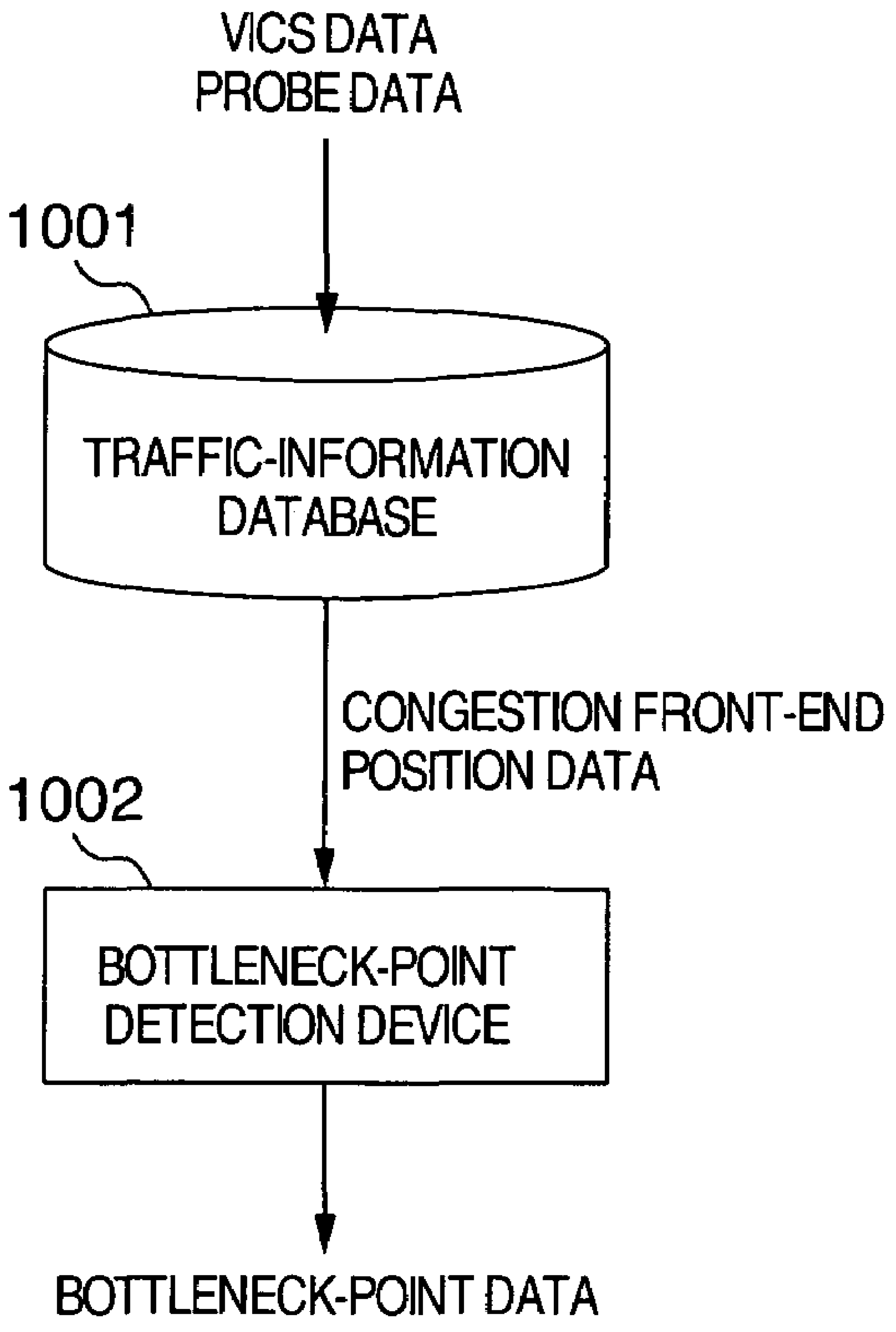
FIG. 12 is a block diagram of a device for detecting and outputting bottleneck points from past traffic information collected by the VICS or the probe car.

Incidentally, the traffic-information database 101 and the bottleneck-point detection device 102 are extracted from the congestion-length prediction device of the present invention, thereby forming a configuration illustrated in FIG. 12. This configuration is usable as a device for detecting and outputting the bottleneck points in accordance with the processing flow in FIG. 2 from the past traffic information collected by the VICS or the probe car. In this case, the detection of the bottleneck points makes it possible to grasp a brief idea of congestion occurrence locations.

Embodiment 2

Figure 5:
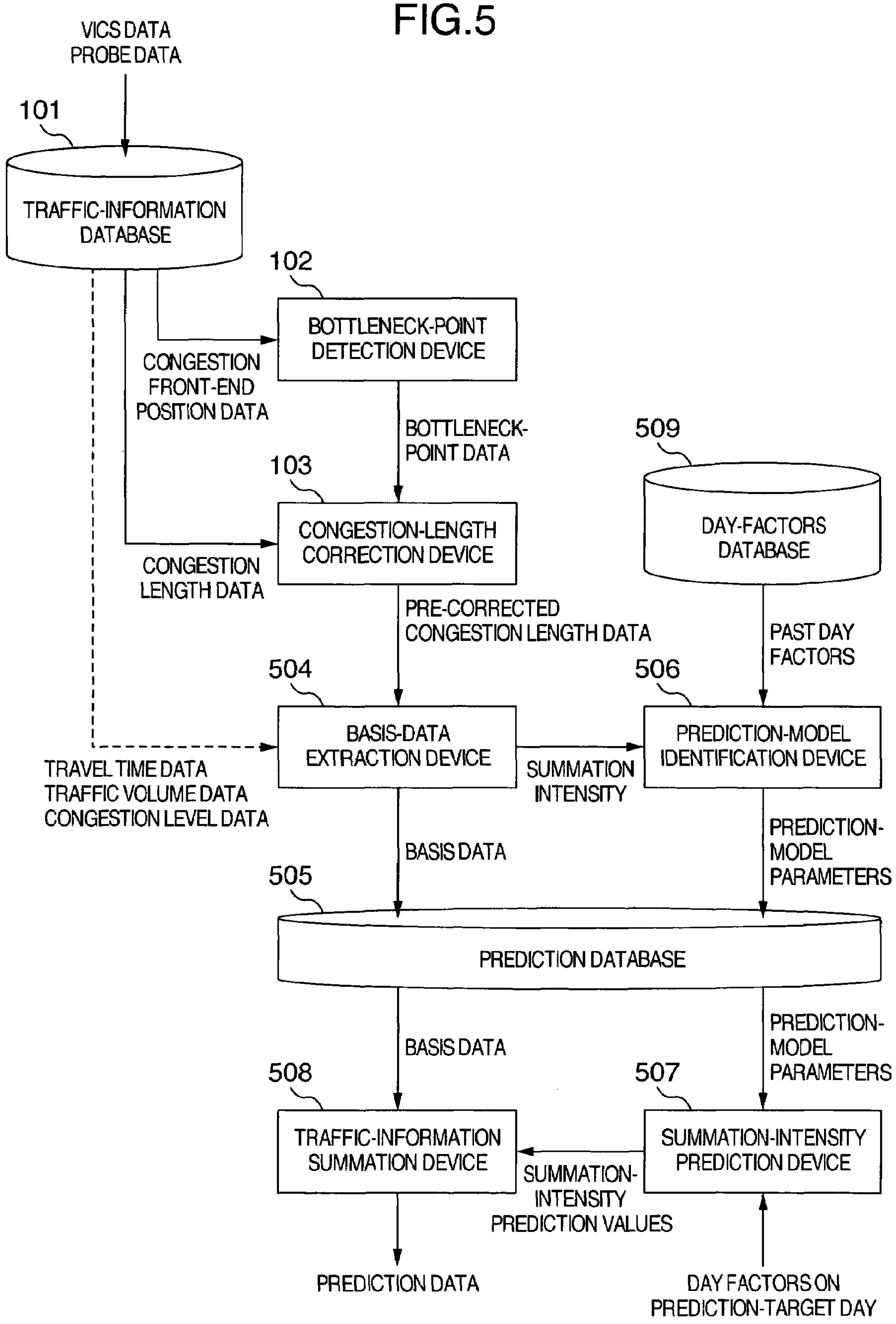
FIG. 5 is a block diagram of a system for predicting traffic-information data by representing the traffic-information data by a linear summation of basis data.

FIG. 5 illustrates configuration of a system for predicting traffic-information data in accordance with the following method: Namely, in the congestion-length prediction device where the present invention is used, instead of performing the regression analysis on each point-in-time basis like the first embodiment, the congestion length data on a day-unit basis is approximately represented by a linear summation of plural pieces of basis data which are the type of data that represent rush hours in the morning or evening. Then, the regression analysis in which the day factors are defined as the independent variables is performed with respect to each summation intensity of each basis data. This allows identification of a regression model and execution of the prediction operation using the regression model in a feature space whose dimension is lowered as compared with the original congestion length data.

In this embodiment, using the principal component analysis, a basis-data extraction device 504 calculates the plural pieces of basis data the linear summation of which approximately represents the pre-corrected congestion length data. Here, the data which becomes the target of the principal component analysis is congestion-length time-sequence data L (C, d, t) which results from fixing the bottleneck point c at c=C in the pre-corrected congestion length data L (c, d, t) explained in the first embodiment. Also, the congestion-length time-sequence data L (C, d, t) by the amount of one day is defined as 1 sample. For example, if the traffic information such as travel time, the congestion level, and the congestion length is data which is measured for N days and at the same points-in-time that are M times per day, it turns out that the principal component analysis is performed employing, as the target, a data group which includes N samples and 1 sample of which includes M variables. FIG. 6 illustrates its data structure schematically. Here, X(a, b) indicates the value of data measured on the a-th day and at the b-th time. In general, the travel time data collected by the VICS is measured with a 5-minute time-interval on common roads, and thus the travel time data is measured 12 times per hour. Accordingly, b=84 holds for the data measured at 7:00 a.m., since 7 [hours]×12 [times/hour]=84.

FIG. 6 illustrates an arrangement which results from recording the measured data with the row direction defined as the date and the column direction defined as the point-in-time. Here, X(1, m), X(2, m), . . . , X(N, m) are equivalent to L (C, 1, t), L (C, 2, t), . . . , L (C, N, t), respectively. When the data is measured M times per day with an equal time-interval, the relationship between X(a, b) and L (C, date d, point-in-time t) turns out to become a=d, b=(t/(24×60))×M (in the case where t is denoted in minute unit).

Coupling-coefficient vectors which are P in number are acquired in decreasing order of the contribution proportion by the principal component analysis in the basis-data extraction device 504. Each of these coupling-coefficient vectors is each basis data, which will be recorded into a prediction database 505 as data to be used in a traffic-information summation device 508. Moreover, each principal component score acquired in a one-to-one correspondence with each coupling-coefficient vector by the principal component analysis is each summation intensity to be used at the time of performing the linear summation of the plural pieces of basis data. In a prediction-model identification device 506, the summation intensities are modeled as functions of day factors. Namely, the regression analysis in which day factors f1 to fN are defined as independent variables is performed selecting, as the target, summation-intensity time-sequence data S (p, d) on a day-unit basis which correspond to each of the plural pieces of basis data 1 to P (where p denotes number of the basis data, and d denotes the date). This regression analysis identifies a summation-intensity prediction model S (p, f1, f2, . . . , fN). The day factors used here, which correspond to the date of the pre-corrected congestion length data inputted into the basis-data extraction device 504, are inputted from a day-factors database 509. Incidentally, as indicator for determining the number P of the coupling-coefficient vectors in the principal component analysis, i.e., the number of the plural pieces of basis data, accumulated contribution proportion is usable which represents approximate accuracy of information in the principal component analysis. For example, if the number of the coupling-coefficient vectors has been determined so that the accumulated contribution proportion becomes equal to 0. 9, the use of the coupling-coefficient vectors and the principal component scores makes it possible to represent 90-% information of the original data selected as the target of the principal component analysis.

Moreover, with day factors on a prediction-target day received as an input, a summation-intensity prediction device 507 calculates prediction values of the summation intensities, using the summation-intensity prediction-model parameters identified by the prediction-model identification device 506 and recorded into the prediction database 505. Furthermore, with the prediction values of the summation intensities used as coefficients, the traffic-information summation device 508 performs the linear summation of the plural pieces of basis data calculated by the basis-data extraction device 504 and recorded into the prediction database 505. Then, the summation device 508 outputs its calculation result as prediction data.

If there exist bottleneck points which are plural in number (i.e., 1 to C), the above-described processing is carried out individually for each of the bottleneck points 1 to C. This makes it possible to perform prediction on the congestion length caused by each bottleneck point.

Meanwhile, as illustrated in FIG. 7, data (the number of the variables per sample is equal to C×M) acquired by coupling of L (1, d, t) to L (C, d, t), i.e., pre-corrected congestion-length time-sequence data at the bottleneck points 1 to C, is selected as the target of the principal component analysis in the basis-data extraction device 504. This makes it possible to acquire basis data which represent in batch congestion lengths up to the bottleneck points 1 to C. Arranging the data in this way has the following meaning: Namely, the time-sequence data at the plural bottleneck points on the same date are dealt with as the single sample, then being inputted into the principal component analysis. This brings about a meaning of summarizing information which has correlations between the respective bottleneck points. In FIG. 7, similarly to FIG. 6, X denotes the measured traffic information such as the travel time, the congestion level, and the congestion length. Similarly to FIG. 6 also, the row direction is defined as the date. In the column direction, however, the point-in-time variable is repeated by the number C of the bottleneck points. Namely, the relationship between X(a, b) and L (bottleneck-point number c, date d, point-in-time t) turns out to become a=d, b=(c−1)×M+(t/(24×60))×M.

Summation intensities of the basis data determined from this data is selected as the target of the regression analysis in the prediction-model identification device 506. This makes it possible to acquire a summation-intensity prediction model on the congestion lengths up to the bottleneck points 1 to C, thereby allowing the prediction-data calculation processing in the summation-intensity prediction device 507 and the traffic-information summation device 508 to be performed in batch for the bottleneck points 1 to C. In this way, in comparison with the method of performing the prediction on the congestion length data individually on each bottleneck-point basis, the method of performing the prediction by coupling the congestion length data at the respective bottleneck points results in the following effect: Namely, when the correlations exist between congestions at the respective bottleneck points, the latter method summarizes the basis data and the prediction-model parameters, thereby reducing the data amount to be recorded into the prediction database 505, and shortening the calculation time needed for the prediction operation.

If the past traffic-information data contains a missing due to communications trouble, malfunction of a sensor, or absence of a probe car, an extension methodology of the principal component analysis referred to as "principal component analysis with missing data (: PCAMD)" for calculating the coupling-coefficient vectors and the principal component scores by using only data which has been normally measured is used instead of the principal component analysis in the basis-data extraction device 504. Dealing with the data which contains a missing is as follows: Namely, instead of the pre-corrected congestion length data, as indicated by the dotted line in FIG. 5, the data such as travel time data, traffic volume data, and numericalized congestion level data is inputted into the basis-data extraction device 504. In addition, when performing the prediction on the travel time data, traffic volume data, or numericalized congestion level data, only the input data merely differs, and the processing in the basis-data extraction device 504 remains the same. Accordingly, application target of the PCAMD-used prediction process in FIG. 5 is not limited to the prediction on the congestion length. Namely, the PCAMD is a method which is used for calculating the basis data when the principal component analysis is unusable due to the existence of a data missing. Differences such that the processing-target data is whether the congestion length data or the travel time data exert no influences on the processing. Regardless of whether the principal component analysis is used or the PCAMD is used in the case of the existence of a missing, the calculation of the basis data can be performed in basically the same way.

Embodiment 3

Instead of including the basis data on each link basis like the second embodiment, representative basis data are prepared in a mesh unit which is a spatial region including plural links. This makes it possible to tremendously reduce the data amount of the basis data to be recorded into the prediction database 505. As the representative basis data on each mesh basis, however, it is impossible to use statistically representative value such as same point-in-time average value of the basis data on each link basis acquired in the second embodiment. The reason for this is as follows: In the process of calculating the same point-in-time average value from the basis data on each link basis, components specific to the traffic-information data of each link are lost. As a result, it becomes impossible to represent the traffic-information data of each link by a linear summation of the representative basis data. Accordingly, in the congestion-length prediction device where the present invention is used, based on a configuration illustrated in FIG. 5, the representative basis data on each mesh basis which include the components specific to the traffic-information data of each link are calculated by the principal component analysis. Then, prediction on the traffic information is performed which uses the representative basis data calculated.

Figure 9:
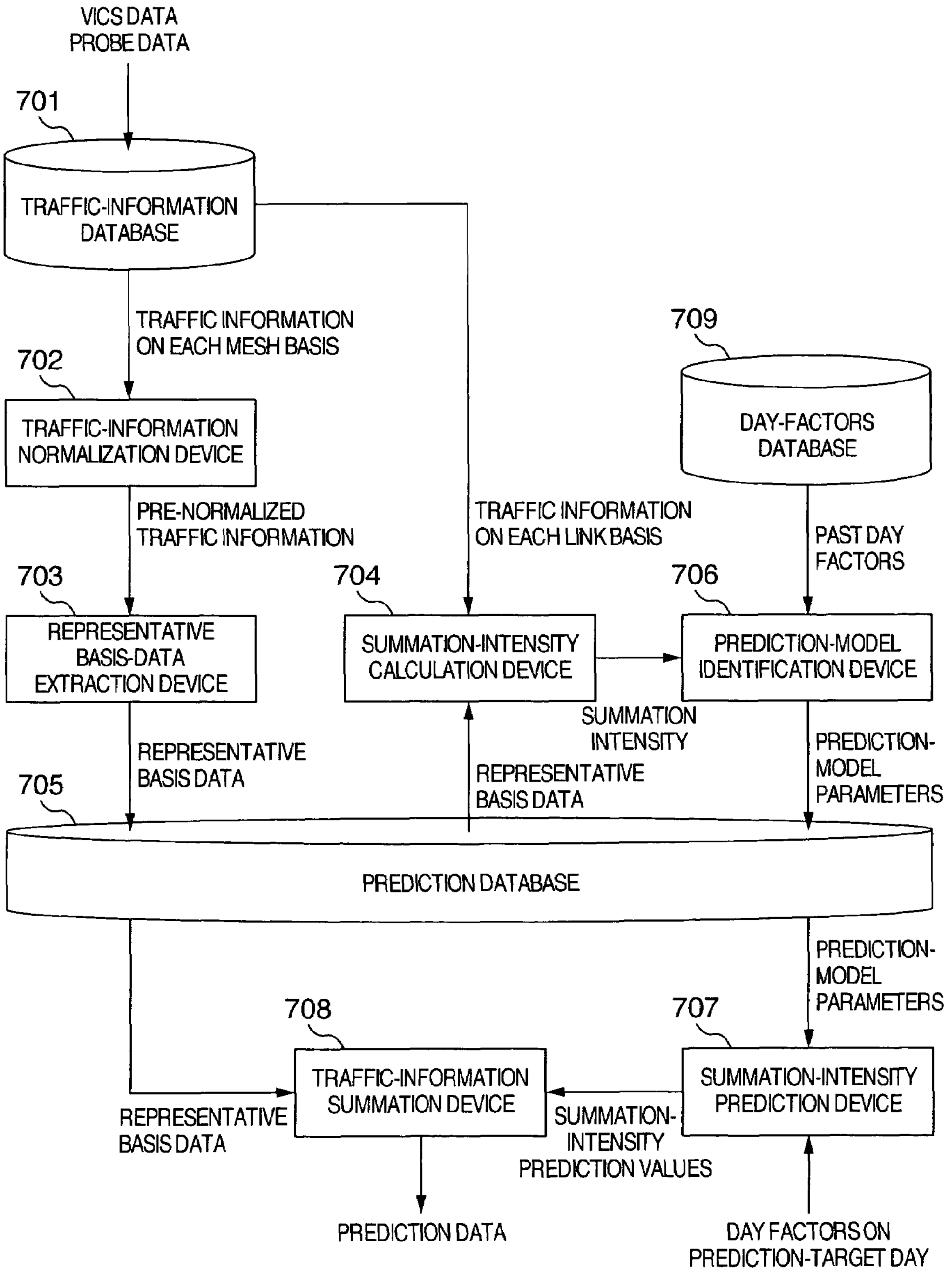
FIG. 9 is a block diagram of a system for predicting traffic-information data in plural links by representing the traffic-information data by a linear summation of representative basis data which are common to the respective links.

In FIG. 9, a traffic-information database 701 is a database device for accumulating the past traffic information collected by the VICS or the probe car. With respect to the past traffic-information data of the plural links within the mesh, a traffic-information normalization device 702 performs normalization of the traffic-information data on each link basis in order to make variances of the traffic-information data of the respective links substantially equal to each other. As a reference value at the time of performing the normalization, it is possible to use the statistically representative value such as average value or median value of the traffic-information data on each link basis. Also, when the traffic information of the prediction target is the travel time, it is also possible to use the standard travel time needed for driving along the link assuming that one drives therealong at the regulation velocity. Namely, the way of selecting the reference value for the normalization is not limited to the present embodiment.

Similarly to the basis-data extraction device 504 in the second embodiment, a representative basis-data extraction device 703 performs calculation of the basis data based on the principal component analysis (or the PCAMD if the data contains a missing). In the basis-data extraction device 504, however, the principal component analysis is performed selecting, as the target, the data group which, as illustrated in FIG. 6, includes N samples and where the data on each link basis by the amount of one day is defined as 1 sample. In contrast thereto, in the representative basis-data extraction device 703, the principal component analysis is performed selecting, as the target, a data group which, as illustrated in FIG. 8, results from coupling the traffic-information data of the plural links within the mesh. In FIG. 8, similarly to FIG. 6, the data which is measured at the same points-in-time that are M times per day is defined as 1 sample. However, assuming that the data by the amount of N days exist for each of the links which are R in number, the sample number of the data which becomes the target of the principal component analysis is equal to N×R. Namely, the data in X ((r−1)N+n, m) in FIG. 8 are equivalent to the traffic-information data by the amount of one day on the n-th day in the link r. Coupling-coefficient vectors acquired by the principal component analysis of the data group like this are the representative basis data in the mesh unit, which include the components specific to the traffic-information data of each link. Incidentally, if the variances of the respective links do not differ so significantly, even if the normalization processing by the traffic-information normalization device 702 is not performed, it is possible to acquire the representative basis data which sufficiently reflect respective data characteristics of each link. Consequently, in this case, the processing by the traffic-information normalization device 702 is not necessarily required.

The representative basis data calculated by the representative basis-data extraction device 703 will be recorded into a prediction database 705. From the representative basis data recorded into the prediction database 705 and the past traffic-information data on each link basis recorded into the traffic-information database 701, a summation-intensity calculation device 704 calculates each summation intensity which is specific to each link with respect to the representative basis data. Each summation intensity specific on each link basis is acquired by a scalar product of the representative basis data and the traffic-information data. For example, letting the representative basis data p be a M-dimensional row vector V (p), and the traffic-information data by the amount of one day on the d-th day in the link r be a M-dimensional row vector Y (r, d), each summation intensity for the representative basis data p on the d-th day in the link r is given by $$S(p,r,d)=V(p)\cdot Y(r,d). \qquad \text{(Expression 2)}$$

In a prediction-model identification device 706, similarly to the prediction-model identification device 506 in the second embodiment, the regression analysis, in which the past day factors f1 to fN recorded in a day-factors database 709 are defined as the independent variables, is performed with respect to the summation-intensity time-sequence data S (p, r, d) on each link basis and on a day-unit basis calculated by the summation-intensity calculation device 704. This regression analysis identifies a summation-intensity prediction model S (p, r, f1, f2, . . . , fN). Moreover, with day factors on a prediction-target day received as an input, a summation-intensity prediction device 707 calculates prediction values of the summation intensities on each link basis, using the summation-intensity prediction-model parameters identified by the prediction-model identification device 706 and recorded into the prediction database 705. Furthermore, with the prediction values of the summation intensities on each link basis used as coefficients, a traffic-information summation device 708 performs the linear summation of the representative basis data calculated by the representative basis-data extraction device 703. Then, the summation device 708 outputs its calculation result as prediction data of each link.

When calculating the representative basis data on each mesh basis in the representative basis-data extraction device 703, if the principal component analysis is performed selecting all the links within the mesh as the target, representative basis data are acquired the linear summation of which is capable of representing all the links within the mesh. In the mean time, a basic congestion pattern appears on trunk roads and their peripheries. Accordingly, even if a partial set defined as, e.g., "trunk roads and links of roads directly intersecting therewith" is selected as the processing target in the representative basis-data extraction device 703, representative basis data are acquired which are capable of representing almost all the links within the mesh. Also, there exists a link on which almost no congestion appears all day long. Consequently, from a partial set as well which results from eliminating such a link with, e.g., magnitude of the standard deviation defined as a threshold value, representative basis data are acquired which are capable of representing almost all the links within the mesh. In this way, the way of selecting the link set used as the target of the principal component analysis in the representative basis-data extraction device 703 is not limited to the entire link set within the mesh, or a particular partial set therein. Also, in the present embodiment, the spatial mesh has been defined as the unit shared by the representative basis data. It is also possible, however, to share the representative basis data by using numbers like the VICS link numbers allocated on each link basis, e.g., by defining as the unit a range of the link numbers such as 1st to 100th. Namely, the way of selecting the shared unit by the representative basis data is not limited to the present embodiment.

The traffic-information data selected as the prediction target in the present embodiment are the data such as travel time data, traffic volume data, and numericalized congestion level data. Accordingly, the traffic-information data are not limited to whatever one data. Incidentally, if the congestion length data is selected as the prediction target, data which are corrected in such a manner as indicating the congestion length from each bottleneck point like the first embodiment are inputted into the traffic-information normalization device 702 and the summation-intensity calculation device 704.

Embodiment 4

In the first to third embodiments, when the VICS data is used as the congestion range data, the VICS data itself includes the data on congestion front-end positions and congestion lengths on each point-in-time basis. Here, these pieces of data have certain distributions. This makes it possible to detect the bottleneck points by accumulating and summarizing the congestion front-end position data. Also, at the time of using probe data, if the probe data includes detailed history on the position and velocity, a processing is performed in which, based on this detailed history, regions where, e.g., the velocity continuously lowers a threshold value are judged to be congestions. This processing allows the congestion front-end positions and the congestion lengths to be easily created, thereby making it possible to input the positions and the lengths into the bottleneck-point detection device 102 and the congestion-length correction device 103. Here, the detailed history on the position and velocity refers to, as a concrete example, probe data which is to be collected in a several-second unit. In this case, if the probe data is to be collected in, e.g., a 1-second unit, the measurement is executable with an about 10-m interval even in the case of the velocity of 40 Km per hour. It is assumed that the data transmitted as the probe data includes at least the position and velocity of the mobile unit. Incidentally, when performing the off-line statistical processing preconditioned in the first to third embodiments, data transmission timing with a frequency of even one time a day is allowable. In this case, the data is accumulated on the vehicle-mounted appliance side from the collection until the transmission.

Meanwhile if the probe data is loose, the probe data includes none of the information on the congestion front-end positions. Namely, in the case where collection time-interval of the probe data is, e.g., one time for every 2 minutes, the mobile unit drives approximately 300 m in 2 minutes even if the mobile unit drives at the velocity of 10 Km per hour. Accordingly, it is impossible to clarify the congestion front-end positions based on the probe data like this. Then, the use of the congestion-length prediction device of the present invention makes it possible to detect the bottleneck points by accumulating and summarizing the congestion positions. This allows the prediction on the congestion lengths from the bottleneck points to be performed even from the probe data whose collection time-interval is loose.

Figure 10:
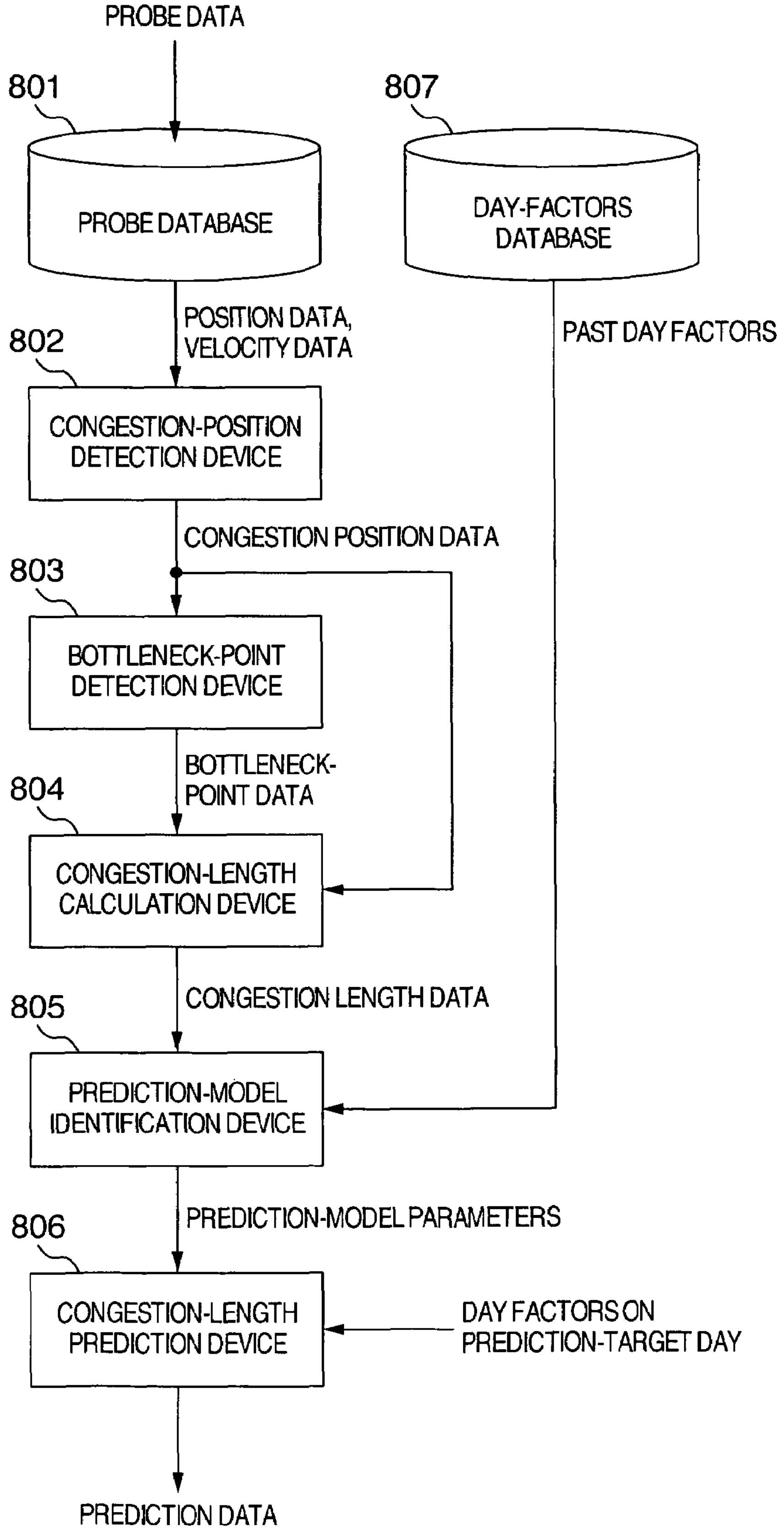
FIG. 10 is a block diagram of a system for detecting bottleneck points from probe data whose collection time-interval is loose, and predicting congestion length with each bottleneck point selected as the reference.

FIG. 10 is a block diagram of a system for inputting the probe data whose collection time-interval is loose, and predicting and outputting the congestion lengths from the bottleneck points. A probe database 801 is a database for accumulating the position data and the velocity data collected by the probe car. A congestion-position detection device 802 performs a processing in which, if the velocity data lowers a certain threshold value, the velocity data is judged to be the congestions. Then, the congestion-position detection device 802 inputs, as the congestion position data, the position data corresponding to this velocity data into a bottleneck-point detection device 803. Here, if the same definition as the one in the VICS data is employed for the congestions, in the case of a link whose regulation velocity is 60 Km/h, velocity of 20 Km/h or less is used as a threshold value to be judged as being "congested", and velocity of 40 Km/h or less is used as a threshold value to be judged as being "crowded". Performing basically the same processing as the one by the bottleneck-point detection device 102 in FIG. 1, the bottleneck-point detection device 803 performs clustering of the congestion position data, then determining its representative value as each bottleneck point. However, in contrast to the fact that the bottleneck-point detection device 102 assumes each of the congestion front-end position data to be one cluster in the initialization of the clustering, the bottleneck-point detection device 803 assumes each of the congestion position data inputted from the congestion-position detection device 802 to be one cluster, then starting the clustering. In this case, distribution range of the congestion position data is wider than that of the congestion front-end position data. Consequently, the threshold value W0 is set to be larger than the one in the clustering of the congestion front-end position data explained in the first embodiment. Also, in this case as well, the value of W0 is determined in compliance with actual situation of roads, such that a distance between intersections on a main road is defined as W0 on common roads.

Also, when calculating the representative value from the clusters whose integration has been completed, cluster's lower-side statistically representative value is employed. Here, the lower-side statistically representative value refers not to average value or median value, but to minimum value or a lower-side $k\sigma$ point. Also, the lower-side $k\sigma$ point is defined as $E-k\sigma$ for the in-cluster average value E, standard deviation $\sigma$, and constant k. The reason for the employment of the lower-side statistically representative value is as follows: Not the congestion front-end positions but the congestion positions are selected as the clustering target data. As a result, if the average value or median value is employed, the representative value of the clustering indicates a substantially intermediate position within the congestion range. On the other hand, if the minimum value or the lower-side $k\sigma$ point is employed, the representative value of the clustering indicates a position which exists on the link downstream side within the congestion range. This position can be assumed to be each bottleneck point. For example, assuming that the distribution of the congestion position data is a normal distribution, in the case of k=1, the lower-side $k\sigma$ point indicates lower-limit value of the range in which about 65% of the congestion position data distributes. Also, in the case of k=2, the lower-side $k\sigma$ point indicates lower-limit value of the range in which about 95% of the congestion position data distributes. This value of k is determined by distribution configuration of the congestion position data.

In a congestion-length calculation device 804, with respect to all of the respective pieces of congestion position data which have been judged to be the congestions since the velocity data corresponding thereto have lowered the threshold value on each link basis, from a distance D1 from link downstream edge to each congestion position detected by the congestion-position detection device 802, and a distance D2 from the link downstream edge to each bottleneck point detected by the bottleneck-point detection device 803, each congestion length (D1-D2) is calculated. Then, the congestion-length calculation device 804 outputs each congestion length to a prediction-model identification device 805. The prediction-model identification device 805 is basically the same as the prediction-model identification device 104 in FIG. 1. Namely, using history of day factors recorded in a day-factors database 807, the prediction-model identification device 805 identifies a congestion-length prediction model by performing the regression analysis in which the day factors are defined as independent variables. A congestion-length prediction device 806 is basically the same as the congestion-length prediction device 105 in FIG. 1. Namely, using the congestion-length prediction model identified by the prediction-model identification device 805, the congestion-length prediction device 806 predicts the congestion lengths from day factors on a prediction-target day.

Figure 11:
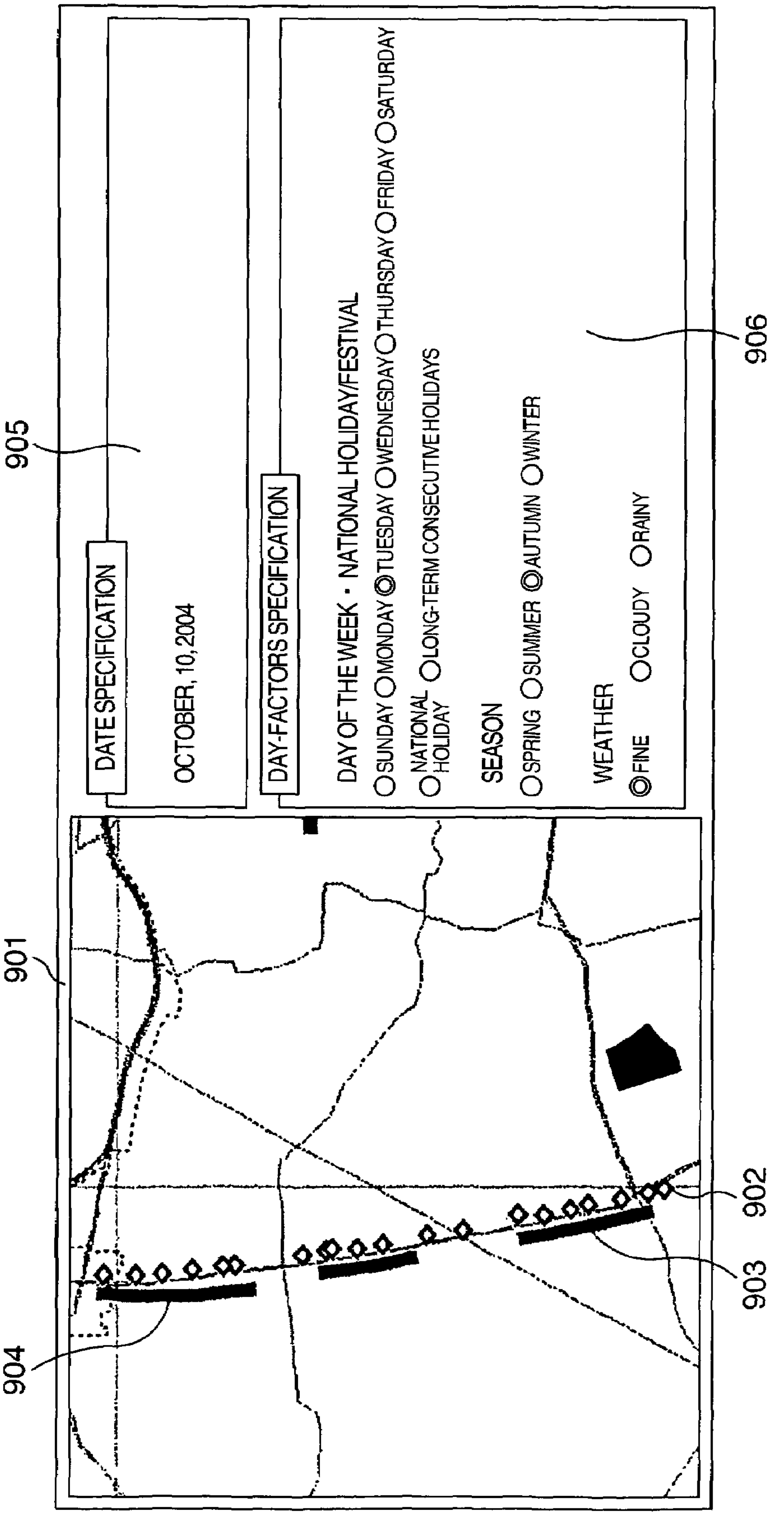
FIG. 11 is a display example of a prediction result acquired by detecting the bottleneck points from the probe data whose collection time-interval is loose, and predicting the congestion length with each bottleneck point selected as the reference.

FIG. 11 is a display example of the output result acquired by the congestion-length prediction device 806 illustrated in FIG. 10. Markers 902 on a map 901 are makers for indicating the positions of the probe data which, of the probe data measured in the past, are judged to be the congestions by the congestion-position detection device 802. A reference numeral 903 denotes line-segments for indicating the congestion ranges whose drawings are described by the amount of lengths of the congestion lengths calculated by the congestion-length prediction device 806 with the bottleneck points detected by the bottleneck-point detection device 803 as the front ends. In correspondence with the velocities which are set in plural number in such a manner as 10 Km/h, 20 Km/h, 40 Km/h, and so on as the judgment criterions for the congestion judgment in the congestion-position detection device 802, the processing explained in FIG. 1 is carried out with respect to the respective velocities. This makes it possible to acquire the congestion-length prediction values in response to the velocities in such a manner as the congestion-length prediction values in the case of having selected 10 Km/h as the judgment criterion, the congestion-length prediction values in the case of having selected 20 Km/h as the judgment criterion, and so on. Moreover, the line-segments 903 for indicating the congestion-length prediction values in response to the respective criterion velocities are displayed such that colors of the line-segments 903 are changed. This makes it possible to display to what extent of range to what extent of crowdedness has extended as indicated by a line-segment 904. Since the bottleneck points and the congestion lengths are generated from the probe data, edge points of the line-segments 903 for indicating the congestion ranges are not necessarily positioned at node positions of the links defined in the VICS, at node positions of links of the digital road map presented by the Legally Incorporated Foundation Japan Digital Road Map Society (DRM), or at set positions of on-road sensors.

A date specification unit 905 is an interface for specifying a prediction-target day. When a date has been specified, reference is made to a database similar to the day-factors database 807 for describing correspondence between dates and the day factors, thereby converting the date into a day factor. Then, the day factor will be inputted into the congestion-length prediction device 806. Also, in substitution for the date specification unit 905, the use of a day-factors specification unit 906 allows the prediction-target day to be specified by a combination of the day factors. In that case, the day factors thus specified will be inputted into the congestion-length prediction device 806.

The present invention is usable for provision of detailed prediction information in traffic-information services. In particular, the present invention is utilized by traffic-information providers. This allows the providers to construct a system for dealing with the large-sized data efficiently, and providing nationwide-area prediction information.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A traffic-information prediction system, comprising:

a traffic-information database for recording congestion front-end position data and congestion length data, said congestion front-end position data indicating front-end positions of congestion ranges, said congestion length data indicating lengths of said congestion ranges from said congestion front-end positions, a bottleneck-point detection device for performing clustering of said congestion front-end position data, and outputting representative values in clusters as bottleneck-point position data, a congestion-length correction device for correcting said congestion length data so that said congestion length data indicate lengths of said congestion ranges from said bottleneck-point positions, a prediction-model identification device for identifying a prediction model of said pre-corrected congestion length data by performing a regression analysis in which day factors, which may include day of the week, weekday/holiday, season, days on a commercial calendar, and weather, are defined as independent variables, and a congestion-length prediction device for calculating congestion-length prediction data on a prediction-target day with day factors on said prediction-target day used as input into said prediction model.

2. The traffic-information prediction system according to claim 1, wherein said congestion-length correction device defines said pre-corrected congestion length data as values, said values being acquired by adding differences between said bottleneck-point position data and said congestion front-end position data to said congestion length data.

3. A traffic-information prediction system, comprising:

a database for recording position data and velocity data collected by a mobile unit, a congestion-position detection device for making a judgment on congestions by making a comparison between said velocity data and a reference value, and a bottleneck-point detection device for performing clustering of position data corresponding to said velocity data, and outputting representative values in clusters as bottleneck-point position data, said velocity data being judged to be said congestions in said congestion-position detection device.

4. A traffic-information prediction system, comprising:

a database for recording position data and velocity data collected by a mobile unit, a congestion-position detection device for making a judgment on congestions by making a comparison between said velocity data and a reference value, a bottleneck-point detection device for performing clustering of position data corresponding to said velocity data, and outputting representative values in clusters as bottleneck-point position data, said velocity data being judged to be said congestions in said congestion-position detection device, a congestion-length calculation device for outputting differences between said bottleneck-point position data and said position data as congestion length data, a prediction-model identification device for identifying a prediction model of said congestion length data by performing a regression analysis in which day factors, which may include day of the week, weekday/holiday, season, days on a commercial calendar, and weather, are defined as independent variables, and a congestion-length prediction device for calculating congestion-length prediction data on a prediction-target day with day factors on said prediction-target day used as input into said prediction model.

5. The traffic-information prediction system according to claim 4, further comprising:

a display device for illustrating said congestion-length prediction data.

6. The traffic-information prediction system according to claim 5, wherein said display device displays line-segments on a map with said bottleneck-point position data defined as starting points, said line-segments having lengths of said congestion-length prediction data.

7. The traffic-information prediction system according to claim 5, wherein said display device displays line-segments on a map with said bottleneck-point position data defined as starting points, said line-segments having lengths of said congestion-length prediction data, color or thickness of said line-segments being changed in correspondence with said reference value for said congestion judgment in said congestion-position detection device.

8. The traffic-information prediction system according to claim 5, further comprising:

an interface device for inputting a date, and a day-factors database for recording correspondence between dates and said day factors, wherein a day factor corresponding to said date inputted from said interface device is read from said day-factors database, and is inputted into said congestion-length prediction device.

9. The traffic-information prediction system according to claim 5, further comprising:

an interface device for inputting a day factor, wherein said day factor inputted is inputted into said congestion-length prediction device.

10. A traffic-information prediction system, comprising:

a database for recording position data on position of a mobile unit and velocity data on velocity of said mobile unit, said position data and said velocity data being collected by said mobile unit, a congestion-position detection device for making a comparison between said velocity data and a predetermined reference value, and making a judgment that, if said velocity data are smaller than said predetermined reference value, said mobile unit is caught in congestions, a bottleneck-point detection device for performing clustering of position data corresponding to said velocity data, and assuming representative values in clusters to be bottleneck-point position data, said velocity data being judged to be said congestions in said congestion-position detection device, a congestion-length calculation device for calculating differences between said bottleneck-point position data and said position data as congestion length data, a prediction-model identification device for identifying a prediction model of said congestion length data by performing a regression analysis in which day factors are defined as independent variables, said congestion length data being calculated by said congestion-length calculation device, said prediction-model identification device identifying said congestion-length prediction model at said bottleneck-point positions and at a predetermined point-in-time in said congestion length data calculated by said congestion-length calculation device, said bottleneck-point positions being detected by said bottleneck-point detection device, and a congestion-length prediction device for calculating congestion-length prediction data on a prediction-target day with day factors on said prediction-target day used as input into said prediction model.

* * * * *